(12) United States Patent
Kim et al.

(10) Patent No.: US 9,199,371 B2
(45) Date of Patent: Dec. 1, 2015

(54) WALL FRAME MARKING TOOL (71) Applicants: Myoung Il Kim, Edison, NJ (US); Haion Won, Basking Ridge, NJ (US)

(72) Inventors: Myoung Il Kim, Edison, NJ (US); Haion Won, Basking Ridge, NJ (US)

( * ) Notice: Subject to any disclaimer, the term of this patent is extended or adjusted under 35 U.S.C. 154(b) by 279 days.

(21) Appl. No.: 13/665,571

(22) Filed: Oct. 31, 2012

(65) Prior Publication Data
US 2014/0115908 A1 May 1, 2014

(51) Int. Cl.
*B25H 7/04* (2006.01)
*B43L 7/10* (2006.01)
*G01B 3/56* (2006.01)

(52) U.S. Cl.
CPC ... *B25H 7/04* (2013.01); *B43L 7/10* (2013.01); *G01B 3/563* (2013.01)

(58) Field of Classification Search
CPC .............. B65H 7/00; B65H 7/04; B43L 7/10; G01B 3/563
USPC .................................................. 33/472, 465
See application file for complete search history.

(56) References Cited

U.S. PATENT DOCUMENTS

| | | | | |
|---|---|---|---|---|
| 1,585,563 A * | 5/1926 | Schlattau | | 33/471 |
| 1,797,213 A * | 3/1931 | Marcum | | 33/499 |
| 2,529,640 A * | 11/1950 | Thomas | | 33/471 |
| 3,096,586 A * | 7/1963 | Albright et al. | | 33/26 |
| 4,562,649 A * | 1/1986 | Ciavarella | | 33/419 |
| 4,745,689 A * | 5/1988 | Hiltz | | 33/451 |
| 4,920,658 A * | 5/1990 | Hile | | 33/499 |
| 5,020,233 A * | 6/1991 | Syken | | 33/465 |
| 5,129,154 A | 7/1992 | Aydelott | | |
| 5,392,525 A * | 2/1995 | Chow | | 33/465 |
| 5,768,795 A | 6/1998 | Jimenez | | |
| 6,141,882 A * | 11/2000 | Syken | | 33/471 |
| 6,971,184 B2 | 12/2005 | Prevost | | |
| 7,047,655 B2 * | 5/2006 | Larsson | | 33/471 |
| 7,191,534 B2 | 3/2007 | Szumer | | |
| 7,752,765 B2 * | 7/2010 | Shapiro | | 33/471 |
| 7,934,322 B2 * | 5/2011 | Wixey | | 33/471 |

* cited by examiner

Primary Examiner — Christopher Fulton
(74) Attorney, Agent, or Firm — Seung Law Firm (57) ABSTRACT

A wall frame marking tool comprises a pair of arm members, a pair of sliders, and a pair of retainers. The arm member comprises a base, a slider receiver and a pivot portion. The base is a single elongated flat bar. The slider receiver comprises edge beading, a slider receiver, a plurality of notches, a straight line beading, and a slot. The pivot portion comprises a pivot area having two bumps and a plurality of grooves, a triangular-shaped beading, a straight line beading, and edge beading. The slider comprises a base, edge beading, two lips, a straight line beading, and a positioner. The retainer has a bulge, two legs, and two notches. Two arm members are pivotally connected and jointed by overlapping their pivot areas by that two bumps of one arm member are inserted into two of the grooves of the other arm member.

19 Claims, 9 Drawing Sheets

WALL FRAME MARKING TOOL

BACKGROUND OF THE INVENTION

1. Field of the Invention

The present invention is related to the field of wall marking tools for installation of decorative wall frames on the wall.

2. Description of the Prior Art

Wall frames are a decorative element that break up expanses of wall and add architectural interest to the wall. Popular locations include entryways, hallways, stairways, living rooms, dining rooms, and even bedrooms. Wall frames are commonly in the shape of a rectangle or square in rooms and of a parallelogram in stairways.

In order to install wall frames on walls, decorators first have to mark wall frame moldings on the walls. Most of them have typically used a conventional method of marking wall frame moldings together with conventional marking tools. The method generally includes the following steps: 1) make a upper left horizontal mark, 2) make an upper left vertical mark, 3) make an upper right horizontal mark, 4) make an upper right vertical mark, 5) snap a upper line between two upper horizontal marks, 6) make a lower left horizontal mark, 7) make a lower left vertical mark, 8) make a lower right horizontal mark, 9) make a lower right vertical mark, 10) snap a lower line between two lower horizontal marks, 11) make location marks for all wall frames, 12) draw vertical lines for the wall frames, and 13) nail the wall frames using a level. The method requires several tools, such as a ruler, a level, laser or snapping lines, and a pencil, in order to completely perform a wall frame marking job. The method requires decorators to spend a lot of time to perform the marking job and to use several tools. Therefore, the labor cost of the wall frame marking can be high.

No particular device or tool for wall fame marking has been invented and developed in order to save time and cost in performing the wall frame marking job and to make this marking job easier and faster by removing many steps of the conventional method eliminating other tools.

Therefore, a new device or tool for the wall frame marking would be useful and desirable for professional decorators as well as do-it-yourself amateurs to make this wall frame marking job easier and faster without using several tools.

SUMMARY OF THE INVENTION

A wall frame marking tool comprises a pair of arm members, a pair of sliders, and a pair of retainers.

The pair of arm members is identical, and each of the arm members comprises a base, a slider receiver and a pivot portion.

The base is a single elongated flat bar having a length, width and thickness. The width of the base is not constant; the width on one side of the base is wider than that on the other side of the base. The slider receiver is formed on the wider side of the base, and the pivot portion is formed on the other, narrower side of the base.

The slider receiver has a rectangular shape and bilateral symmetry. The slider receiver comprises an edge beading on the edges of the top, left and right sides of both front and back faces of a slider receiver, a plurality of notches, having a rounded shape, formed in opposed inner edge of the edge beading of both sides on the front face of the slider receiver, a straight line beading running horizontally from the end of the left side of the slider receiver to the end of the right side of the slider receiver on the back face of the slider receiver, and a slot, which is located in the middle of the slider receiver, running from the top end of the slider receiver to the straight line beading.

There is the same number of notches on the inner edge beading of each of the left and right sides of the slider receiver. The distance between every two notches located on each side is 0.5 inch. Each notch on one side of the slider receiver corresponds exactly to each notch on the other side of the slider receiver.

The pivot portion comprises a pivot area, which is located at the end of one side on the pivot portion, a triangular-shaped beading at the end of an opposite side on a front face of the pivot portion, a straight line beading on the back face of the pivot portion, and an edge beading on all edges of the back face of the pivot portion.

The pivot area on the front face of the pivot portion has two bumps and a plurality of grooves which are in an even number. Both bumps and the plurality of grooves are located in a circle radially, at the same distance from the center of the pivot area, and at the same angle and distance from each other. Two bumps face each other and every two grooves face each other from the center of the pivot area. There is a small hole in the center of the pivot area. The back face of the pivot area forms a squat cylinder shape, which is protruded from the back face of the pivot portion. The height of the back face of the pivot area is lower than that of the edge beading of the back face of the pivot portion.

The width of the pivot portion is narrower than that of the slider receiver, and the top face of the pivot portion is horizontally connected to the top face of the slider receiver so that the top face of the arm member is flat and level. The total thickness of the pivot portion except the triangular-shaped beading is a half of that of the slider receiver.

Two arm members are pivotally connected and jointed by overlapping their pivot areas by that two bumps of one arm member are inserted into two of the grooves of the other arm member. Therefore, when two arm members are connected to each other, the thickness of the connected two arm members is the same as that of each arm member.

Two arm members are securely connected each other without movement or fall-off by fastening them with securing tools such as a bolt with a nut, through the small hole of the center of pivot area of each arm member. Two arm members are connected to each other through their pivot areas can form a V-shape or L-shape with various angles ranging from 30 degrees to 90 degrees. Therefore, the angle between two arm members can be selectively adjusted.

The pair of sliders is identical, and each of the sliders comprises a base which is a single elongated flat bar having a rectangular shape, an edge beading, a straight line beading, two lips, two notches, and a positioner.

The slider has an edge beading on the edges of the bottom, left and right sides of the front face of the slider. The straight line beading of the slider is connected between the edge beading on the left and right sides of the front face of the slider.

The slider has two lips on the edge beading on both sides of the slider; one lip on the top end of the left edge beading of each slider, and the other lip on the top end of the right edge beading of each slider. Two lips are inserted into two of the notches of each slider receiver. There are two notches on the top of the slider: one is on the left end of the top of the slider, and the other is on the right end of the top of the slider. Two notches of the slider are identical each other. Each slider notch is behind each lip of the slider, and the depth of the slider notch ends right above the straight line beading of the front face of the slider. The slider notches enable the lips of the slider to slightly move forth and back so that the lips are easily placed into the notches of the slider receiver and to move up and down among the notches of the slider receiver.

Each slider has a positioner in the middle of the top of each slider and a straight line beading right below the positioner running horizontally from the left side to the right side of the front face of each slider. The positioner of the slider is in a square or rectangular shape and has a hole in the center of the positioner. The hole is also in a square or rectangular shape. The positioner is protruded outwardly from both the front and back faces of the slider so that the positioner has its front and back portions. The height of the positioner on the front face of the slider is the same as that of both the edge beading and the straight line beading on the front face of the slider. The height of the positioner on the back face of the slider is the same as the thickness of the base of the slider receiver.

The size of the hole of the front face of the postioner is bigger than that of the hole of the back face of the positioner. The depth of the front hole of the positioner is deeper than that of the back hole of the positioner. The depth of the back hole of the positioner is shorter than the width of notches of the retainer. The back portion of the positioner is placed in the slot of the slider receiver and can be moved up and down in the slot.

The slider is placed, and can be moved forth and back, in the slider receiver of the arm member by placing two lips of the slider into any two of the notches of the slider receiver and moving them back and forth as well as by placing the back of the positioner in the slot and moving it back and forth.

All beadings, including the triangular-shaped beading, the straight line beadings, and the edge beadings of both arm member and slider, are designed for elevating the rigidity of both the arm member and the slider.

A pair of retainers is identical, and each of the retainers comprises a single bar of elastic material having outwardly a bulge in the middle of the bar, which is in a similar shape of the majuscule letter of omega ($\Omega$). The retainer has a bilateral symmetry. The retainer has a bulge, two legs, and two notches. The bulge of the retainer is in arch or rounded shape so that the retainer can be easily squeezed by its two legs.

Two legs of the retainer are identical and horizontally flat on the opposite side. The edges of the two legs may be chamfered and dulled in order that users can easily squeeze the retainer without cutting their fingers. Thus, the bulge and two legs enable the retainer to be easily pushed into and pulled out from the hole of the positioner. Two notches of the retainer are identical, and each notch is located between the bulge and each leg. The notches make the retainer stay still in the hole of the positioner, and consequently make the slider stay still in the slider receiver without movement. The retainer is used to securely fix the slider into the slider receiver by preventing the slider from falling off from and moving around inside the slider receiver.

When the slider is placed in and connected to the slider receiver, the bulge of the retainer is inserted into the hole of the back portion of the positioner by squeezing two legs, and then the notches of the retainer firmly hold the slider through the positoner by making the outer edges inside the back hole of the positioner fixed into the notches of the retainer.

In a case that the slider is innermostly placed into the slider receiver by that the lips of the slider are inserted into the inmost notches of the slider receiver, the width of this invention may be between 2.0 inches and 3.5 inches, preferably 2.5 to 3.0 inch. In a case that the slider is outermostly placed into the slider receiver by that the lips of the slider are inserted into the outermost notches of the slider receiver, the width of this invention may be between 4.0 inches and 7.0 inches, preferably 4.0 to 5.0 inches. Therefore, the width of this invention can be selected ranging from 2.0 inches to 7.0 inches.

According to wall frame sizes, this invention can be adjusted to space ranging from 2.0 inches to 7.0 inches. The space is regarded as a distance between wall frames and all edges of the walls, usually between wall frames and the chair rail and baseboard of the walls.

This invention may be used as follows: 1) determine wall frame sizes and the space around wall frames from a wall, 2) set the height of each arm member as the same as the size of the determined space by adjusting the location of the slider in the slider receiver, 3) set the angle between two arm members corresponding to the shape of the wall frames, 4) put this invention on either top or bottom corner of one side of the wall, specifically either below the chair rail or above the baseboard on one side of the wall, wherein the bottom faces of the sliders simultaneously contact both one side edge of the wall and either the bottom edge of the chair rail or the top edge of the baseboard, 5) put one wall frame in the space between two arm members by having the wall frame touch on the top faces of two arm members, 6) nail the wall frame on the wall, 7) put this invention right next to the wall frame and on either top or bottom edge of the wall, 8) put the second wall frame on the invention, 9) nail the second wall frame on the wall, and 10) repeat this process until all wall frames are installed on the wall.

This invention causes several conventional tools for marking wall frames on the wall such as rulers, levels, lasers, snapping lines, and even pencils, to be no longer necessary, and it makes the wall frame marking job simpler, easier, quicker and more convenient. This invention can be easily used by anyone without hardship.

BRIEF DESCRIPTION OF THE DRAWING

The invention is more easily understood when the following detailed description of the preferred embodiments of the invention and the accompanying drawings are explained.

DETAILED DESCRIPTION OF THE INVENTION

Figure 1:
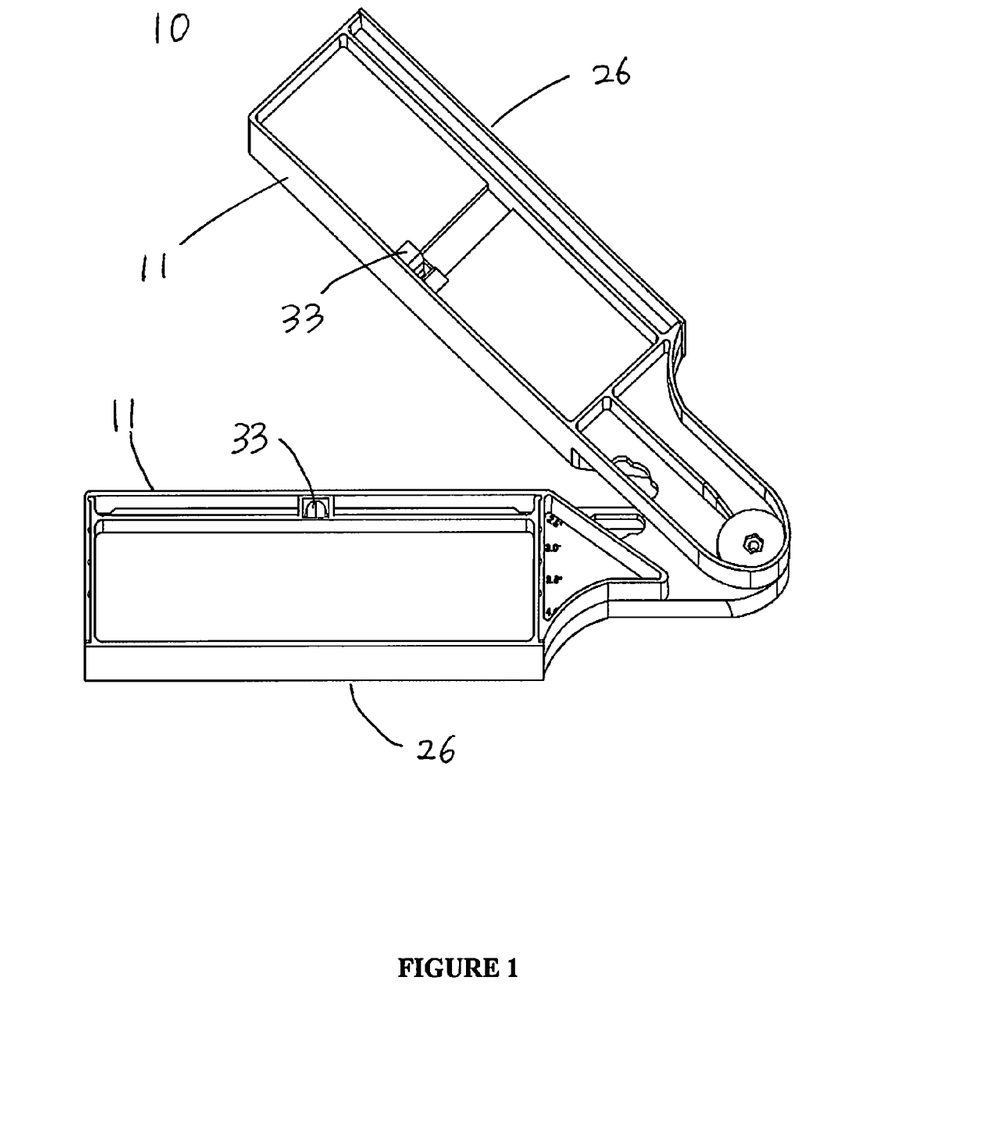
FIG. 1 illustrates a front perspective view of an embodiment of the wall frame marking tool, wherein two arm members are pivotally connected to each other at 45 degree angle.
Figure 2:
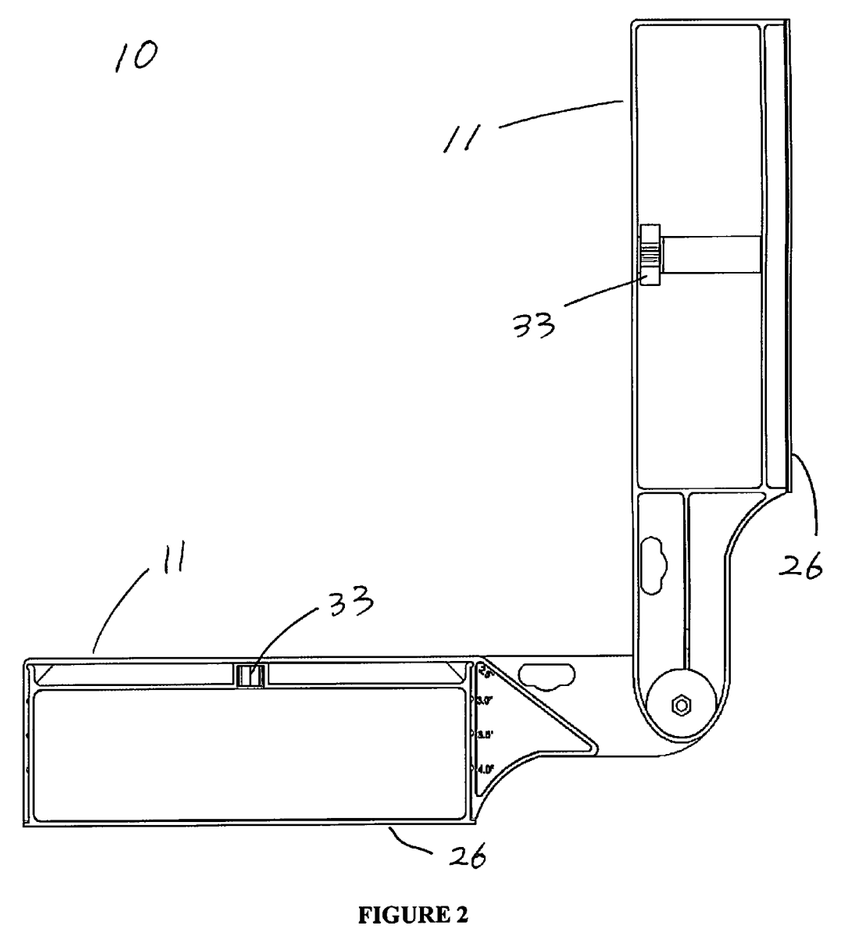
FIG. 2 illustrates a front view of the wall frame marking tool embodiment wherein two arm members are pivotally connected to each other at right angle.

FIG. 1 and FIG. 2 illustrate a front perspective view and front view of an embodiment of a wall frame marking tool 10 respectively, wherein two arm members 11 are pivotally connected to each other at right angles. A wall frame marking tool 10 comprises a pair of arm members 11, a pair of sliders 26, and a pair of retainers 33.

Figure 3:
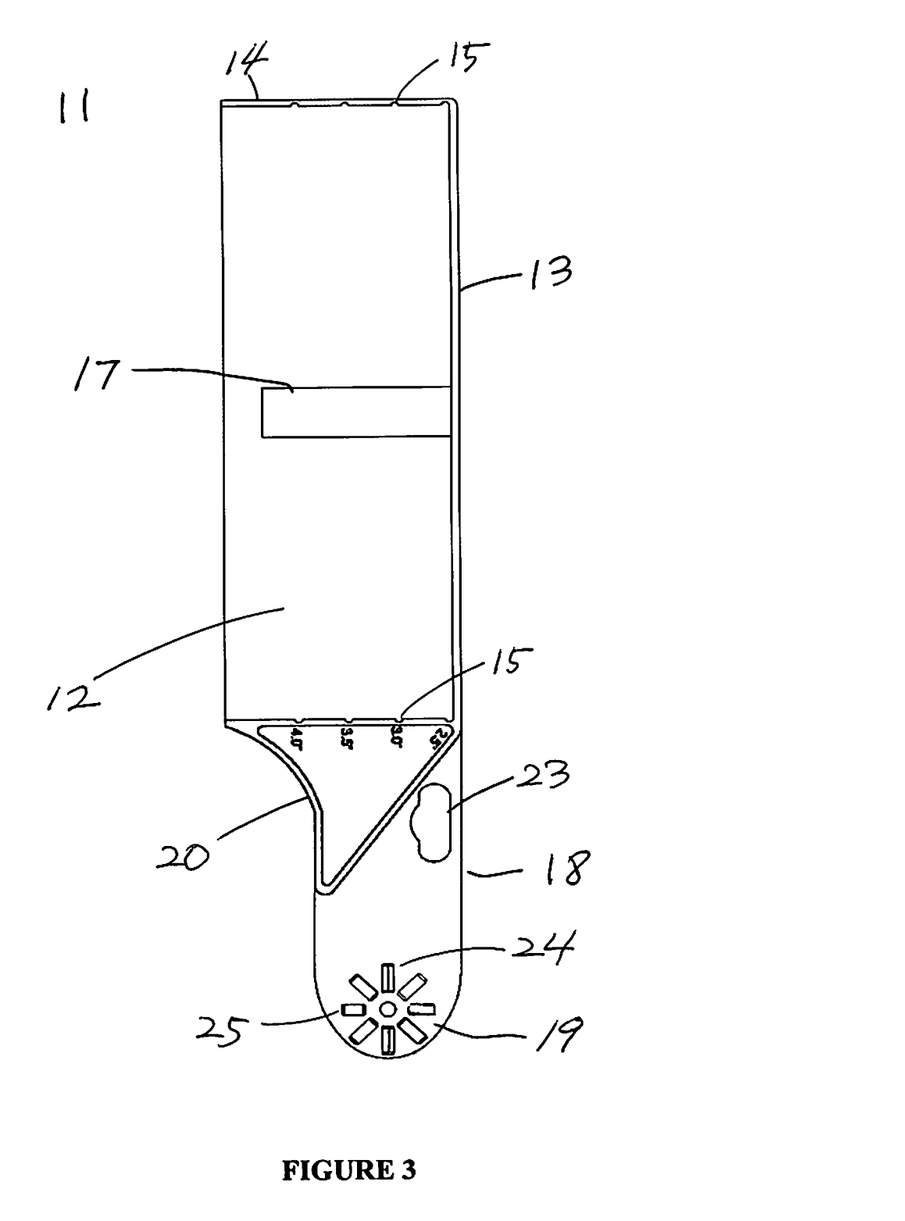
FIG. 3 illustrates a front view of an arm member.
Figure 4:
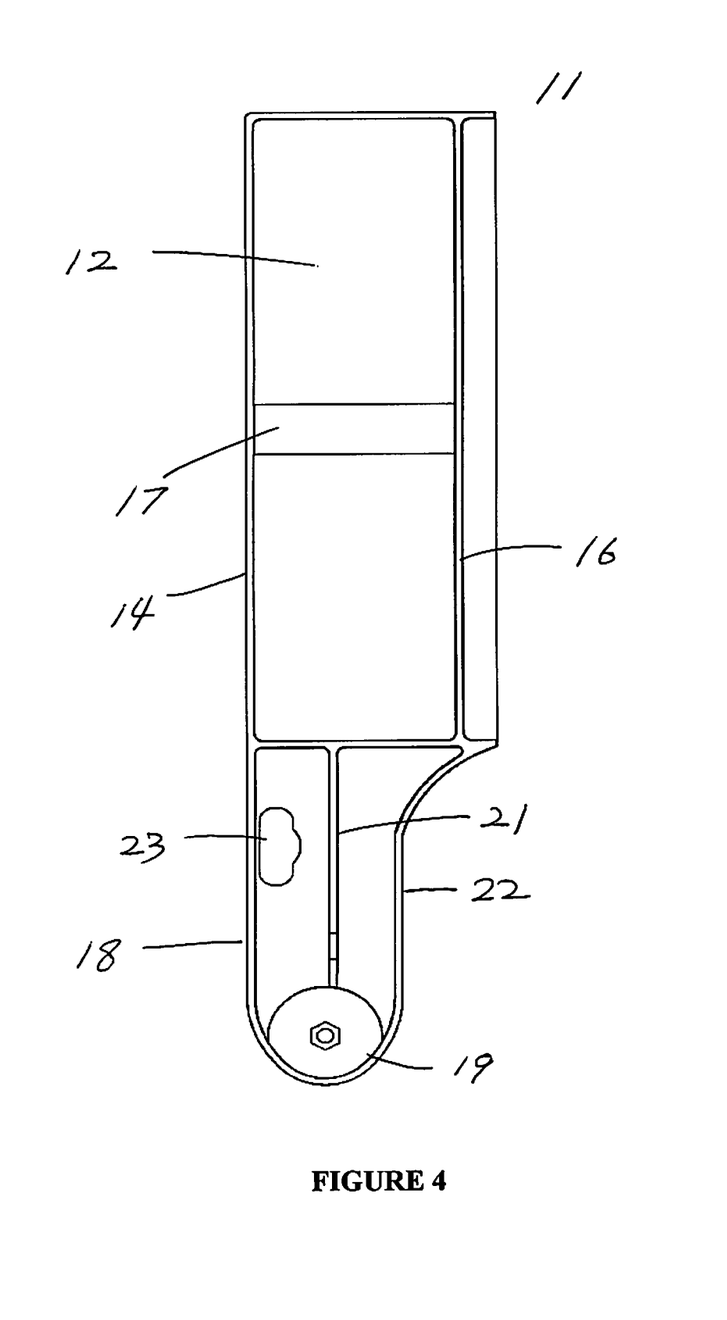
FIG. 4 illustrates a rear view of an arm member.

FIG. 3 and FIG. 4 illustrate a front view and rear view of an arm member 11 respectively. The pair of arm members 11 is identical, and each of the arm members comprises a base 12, a slider receiver 13 and a pivot portion 18.

The base 12 is a single elongated flat bar having a length, width and thickness. The width of the base 12 is not constant; the width on one side of the base 12 is wider than that on the other side of the base 12. The slider receiver 13 is formed on the wider side of the base 12, and the pivot portion 18 is formed on the other, narrower side of the base 12.

The slider receiver 13 has a rectangular shape and bilateral symmetry. The slider receiver 13 comprises an edge beading 14 on the edges of the top, left and right sides of both front and back faces of a slider receiver 13, a plurality of notches 15, having a rounded shape, formed in opposed inner edge of the edge beading 14 of both sides on the front face of the slider receiver 13, a straight line beading 16 running horizontally from the end of the left side of the slider receiver 13 to the end of the right side of the slider receiver 13 on the back face of the slider receiver 13, and a slot 17, which is located in the middle of the slider receiver 13, running from the top end of the slider receiver 13 to the straight line beading 16.

There is the same number of notches 15 on the inner edge beading 14 of each of the left and right sides of the slider receiver 13. The distance between every two notches 15 located on each side is 0.5 inch. Each notch 15 on one side of the slider receiver 13 corresponds exactly to each notch 15 on the other side of the slider receiver 13.

The pivot portion 18 comprises a pivot area 19, which is located at the end of one side on the pivot portion 18, a triangular-shaped beading 20 at the end of an opposite side on a front face of the pivot portion 18, a straight line beading 21 on the back face of the pivot portion 18, and an edge beading 22 on all edges of the back face of the pivot portion 18.

The pivot area 19 on the front face of the pivot portion 18 has two bumps 24 and a plurality of grooves 25 which are in an even number. Both bumps 24 and the plurality of grooves 25 are located in a circle radially, at the same distance from the center of the pivot area 19, and at the same angle and distance from each other. Two bumps 24 face each other and every two grooves 25 face each other from the center of the pivot area 19. There is a small hole in the center of the pivot area 19. The back face of the pivot area 19 forms a squat cylinder shape, which is protruded from the back face of the pivot portion 18. The height of the back face of the pivot area 19 is lower than that of the edge beading of the back face of the pivot portion 18.

One edge of the triangular-shaped beading 20 is entirely connected to the edge beading 14 of the right side of the front face of the slider receiver 13. The straight line beading 21 of the pivot portion 18 runs horizontally from the left side end of the back face of the pivot portion 18 to the outside end of the back face of the pivot area 19. The straight line beading 21 is vertically connected to the edge beading 22 on the left side of the pivot portion 18. The edge beading 22 on the edge of the left side of the back face of the pivot portion 18 is entirely connected to the edge beading 14 on the edge of the right side of the back face of the slider receiver 13.

The pivot portion 18 may have a hole 23 located between the triangular-shaped beading 20 and the pivot area 19 as well as above the straight line beading 21 of the pivot portion 18. The hole 23 will be used in order for this invention to be hung up on the hook of the wall. The hole can be large enough to easily be hung up on variable hooks.

The height of the edge beading 14 on the front face of the slider receiver 13 is the same as that of the triangular-shaped beading 20. The height of the edge beading 14 on the back face of the slider receiver 13 is the same as both that of the straight line beading 16 of the back face of the slider receiver 13 and that of the edge beading 22 of the back face of the pivot portion 18.

The width of the pivot portion 18 is narrower than that of the slider receiver 13, and the top face of the pivot portion 18 is horizontally connected to the top face of the slider receiver 13 so that the top face of the arm member 11 is flat and level. The total thickness of the pivot portion 18 except the triangular-shaped beading 20 is a half of that of the slider receiver 13.

Two arm members 11 are pivotally connected and jointed by overlapping their pivot areas 19 by that two bumps 24 of one arm member 11 are inserted into two of the grooves 25 of the other arm member 11. Therefore, when two arm members 11 are connected to each other, the thickness of the connected two arm members 11 is the same as that of each arm member 11.

Two arm members 11 are securely connected each other without movement or fall-off by fastening them with securing tools such as a bolt with a nut, through the small hole of the center of pivot area 19 of each arm member 11. Two arm members 11 connected to each other through their pivot areas 19 can form a V-shape or L-shape with various angles ranging from 30 degree to 90 degree. Therefore, the angle between two arm members 11 can be selectively adjusted.

Figure 5:
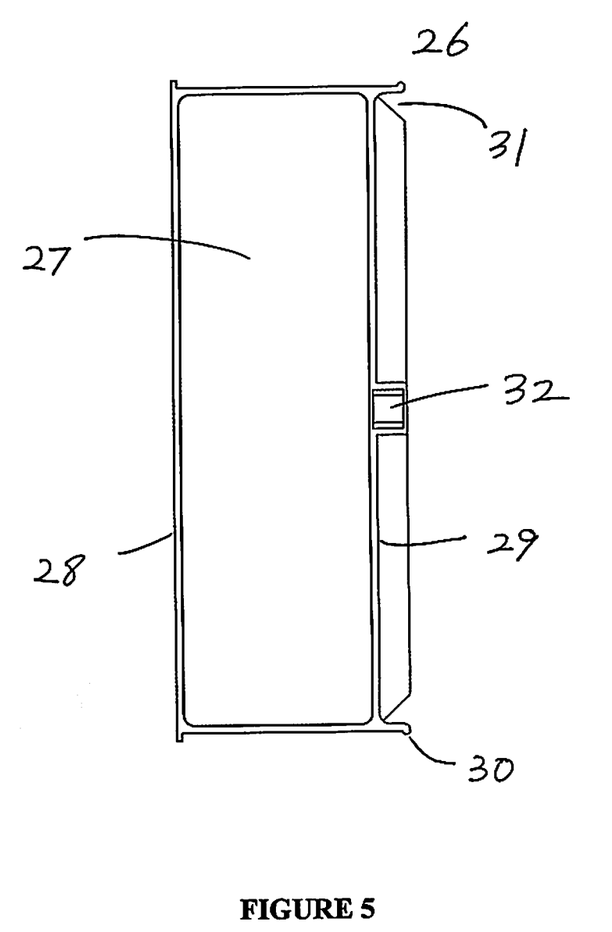
FIG. 5 illustrates a front view of a slider.
Figure 6:
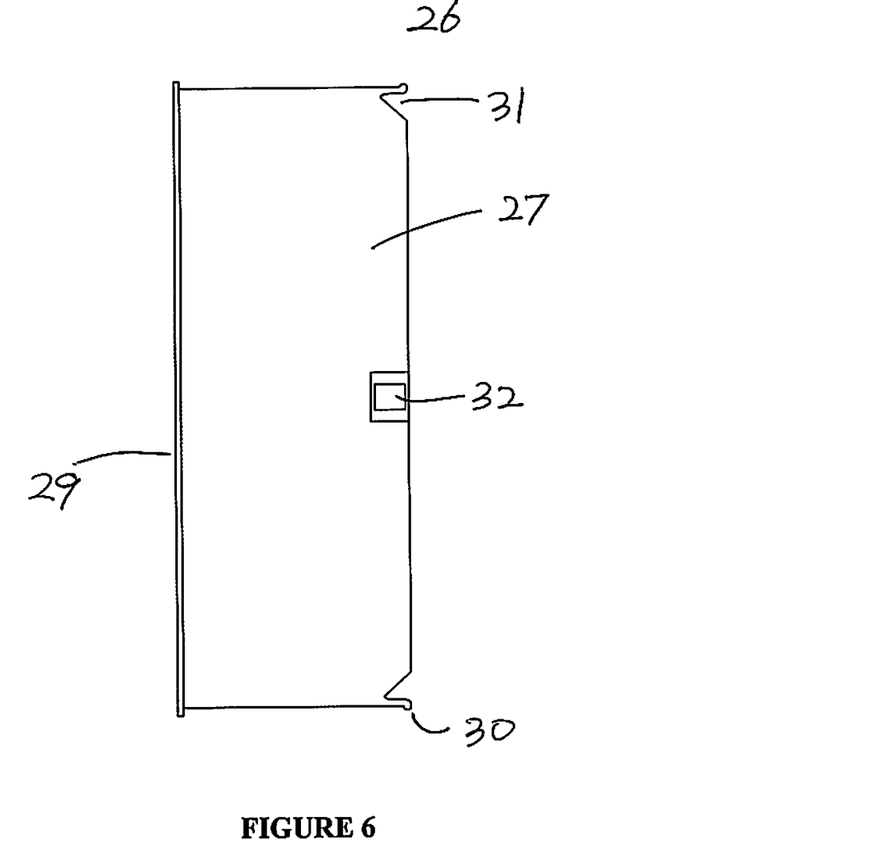
FIG. 6 illustrates a rear view of a slider.

FIG. 5 and FIG. 6 illustrate a front view and rear view of a slider 26 respectively. The pair of sliders 26 is identical, and each of the sliders 26 comprises a base 27 which is a single elongated flat bar having a rectangular shape, an edge beading 28, a straight line beading 29, two lips 30, two notches 31, and a positioned 32.

The slider 26 has an edge beading 28 on the edges of the bottom, left and right sides of the front face of the slider 26. The straight line beading 29 of the slider 26 is connected between the edge beading 28 on the left and right sides of the front face of the slider 26. The bottom edge beading 28 on the front face of the slider 26 is extended to the back face of the slider 26. The ends of both sides of the bottom edge beading 28 of the slider 26 are protruded from or extended over the ends of both left and right sides of the slider 26. The slider notches 31 are located right behind on the top of the edge beading 28 on both sides of the slider.

The slider has two lips 30 on the edge beading 28 on both sides of the slider; one lip 30 on the top end of the left edge beading of each slider, and the other lip 30 on the top end of the right edge beading of each slider 26. The lips 30 are in a rounded shape. Two lips 30 are inserted into two of the notches 15 of each slider receiver 13. There are two notches 31 on the top of the slider 26: one is on the left end of the top of the slider 26, and the other is on the right end of the top of the slider 26. Two notches 31 of the slider 26 are identical each other. Each slider notch 31 is behind each lip 30 of the slider 26, and the depth of the slider notch 31 ends right above the straight line beading 29 of the front face of the slider 26. The slider notch 31 is in a V-shape or triangular shape. The slider notches enable the lips of the slider to slightly move forth and back so that the lips 30 are easily placed into the notches 15 of the slider receiver 13 and to move up and down among the notches 15 of the slider receiver 13.

Each slider 26 has a positioned 32 in the middle of the top of each slider 26 and a straight line beading 29 right below the positioned 32 running horizontally from the left side to the right side of the front face of each slider 26. The bottom face of the positioned 32 is connected to the straight line beading 29 of the front face of the slider 26.

The positioner 32 of the slider 26 is in a square or rectangular shape and has a hole in the center of the positioner 32.

The hole is also in a square or rectangular shape. The positioner 32 is protruded outwardly from both the front and back faces of the slider 26 so that the positioned 32 has its front and back portions. The height of the positioner 32 on the front face of the slider 26 is the same as that of both the edge beading 28 and the straight line beading 29 on the front face of the slider 26. The height of the positioner 32 on the back face of the slider 26 is the same as the thickness of the base 12 of the slider receiver 13.

The size of the hole of the front face of the postioner 32 is bigger than that of the hole of the back face of the positioner 32. The depth of the front hole of the positioner 32 is deeper than that of the back hole of the positioner 32. The depth of the back hole of the positioner 32 is shorter than the width of notches 36 of the retainer 33. The back portion of the positioner 32 is placed in the slot 17 of the slider receiver 13 and can be moved up and down in the slot 17.

Figure 7:
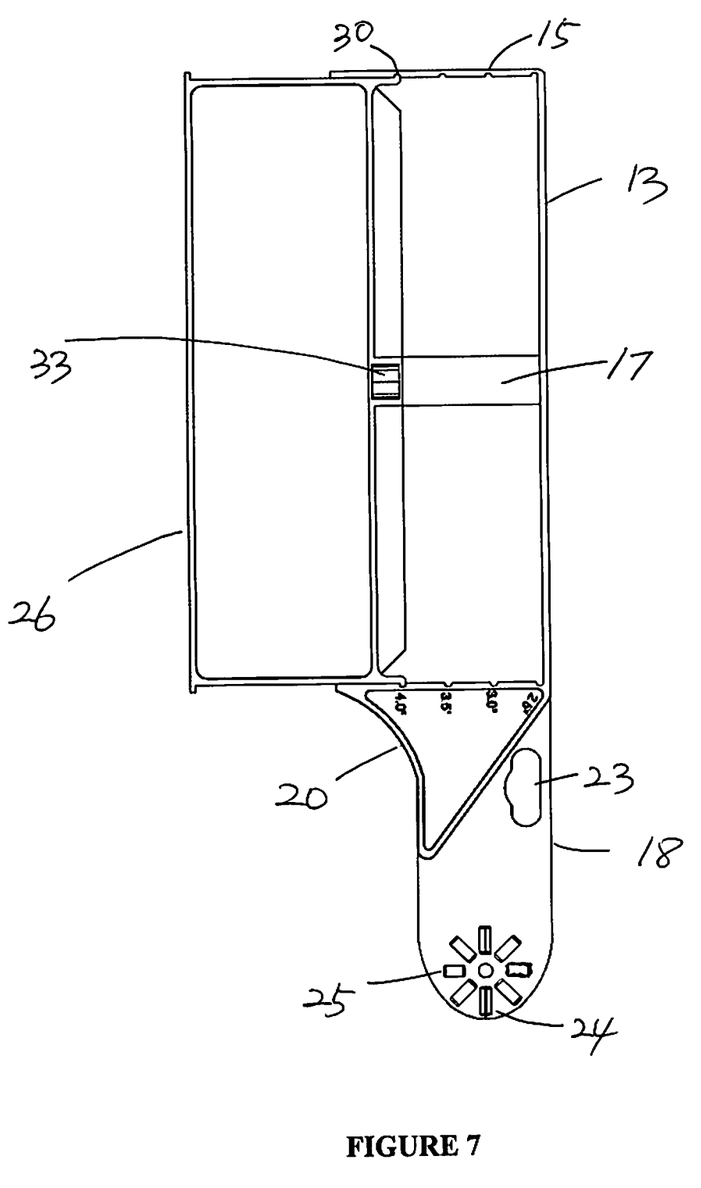
FIG. 7 illustrates a front view of an arm member, wherein a slider is placed into a slider receiver of an arm member.
Figure 8:
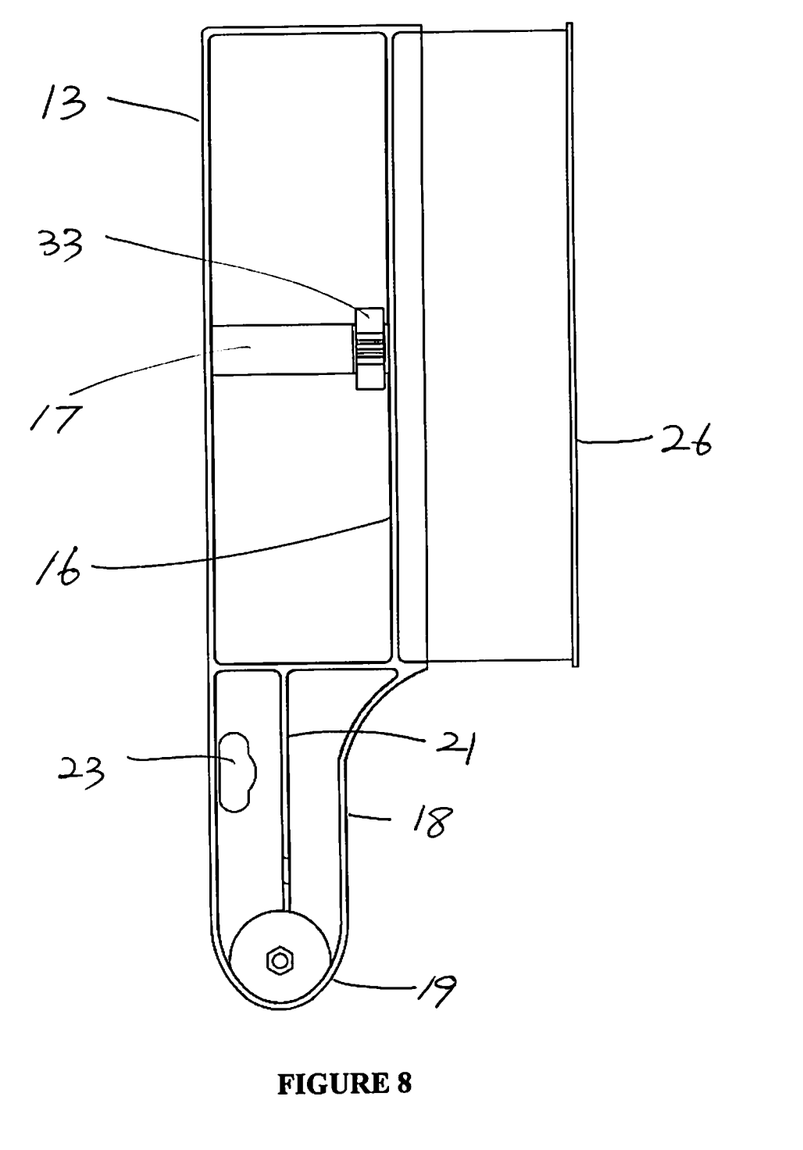
FIG. 8 illustrates a rear view of an arm member illustrated in FIG. 7, wherein a slider is placed into a slider receiver of an arm member.

FIG. 7 and FIG. 8 illustrate a front view and rear view of an arm member 11 respectively, wherein a slider 26 is placed into a slider receiver 13 of an arm member 11. The slider 26 is placed, and can be moved forth and back, in the slider receiver 13 of the arm member 11 by placing two lips 30 of the slider 26 into any two of the notches 15 of the slider receiver 13 and moving them back and forth as well as by placing the back of the positioner 32 in the slot 17 and moving it back and forth.

The thickness of the bottom face of the slider 26 is the same as the thickness of the top and both sides of the slider receiver 13. The thickness of the slider receiver 13 as a whole is the same as that of the slider 26 as a whole. The total thickness of the slider receiver 13 is the same as that of the slider 26. The bottom face of the slider 26 and the top face of the slider receiver 13 should be flat and level.

All beadings, including the triangular-shaped beading 20, the straight line beadings, and the edge beadings of both arm member 11 and slider 26, are vertically formed on the front and back face of both the arm member 11 and the slider 26. Such all headings are designed for elevating the rigidity of both the arm member 11 and the slider 26.

Figure 9A:
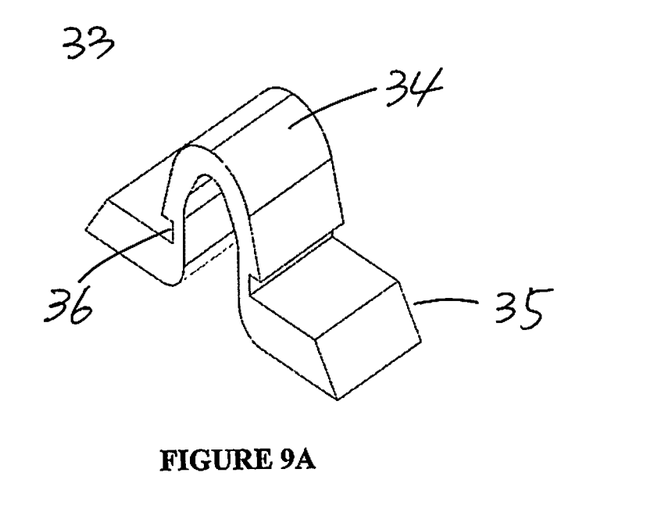
FIGS. 9A and 9B illustrate a front perspective view and a front view of a retainer respectively.
Figure 9B:
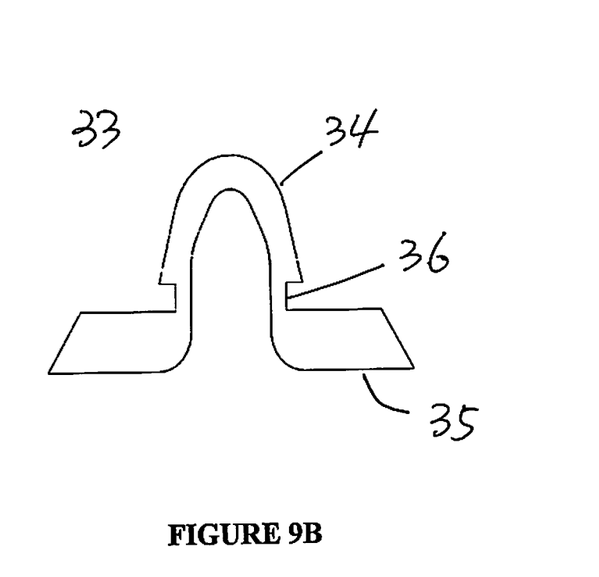

FIG. 9A and FIG. 9B illustrate a front perspective view and a front view of a retainer respectively. A pair of retainers 33 is identical, and each of the retainers 33 comprises a single bar of elastic material having outwardly a bulge 34 in the middle of the bar, which is in a similar shape of the majuscule letter of omega (Ω). The retainer has a bilateral symmetry. The retainer has a bulge 34, two legs 35, and two notches 36. The bulge 34 of the retainer 33 is in arch or rounded shape so that the retainer can be easily squeezed by its two legs 35.

Two legs 35 of the retainer 33 are identical and horizontally flat on the opposite side. The edges of the two legs 35 may be chamfered and dulled in order that users can easily squeeze the retainer without cutting their fingers. Thus, the bulge 34 and two legs 35 enable the retainer 33 to be easily pushed into and pulled out from the hole of the positioned 32. Two notches 36 of the retainer 33 are identical, and each notch 36 is located between the bulge 34 and each leg 35. The notches 36 make the retainer 33 stay still in the hole of the positioned 32, and consequently make the slider 26 stay still in the slider receiver 13 without movement.

The retainer 33 is used to securely fix the slider 26 into the slider receiver 13 by preventing the slider 26 from falling off from and moving around inside the slider receiver 13. When the slider 26 is placed in and connected to the slider receiver 13, the bulge 34 of the retainer 33 is inserted into the hole of the back portion of the positioner 32 by squeezing two legs 35, and then the notches 36 of the retainer 33 firmly hold the slider through the positoner 32 by making the outer edges inside the back hole of the positioner 32 fixed into the notches 36 of the retainer 33.

In a case that the slider 26 is innermostly placed into the slider receiver 13 by that the lips 30 of the slider 26 are inserted into the inmost notches 15 of the slider receiver 13, the width of this invention may be between 2.0 inches and 3.5 inches, preferably 2.5 to 3.0 inches. In a case that the slider 26 is outermostly placed into the slider receiver 13 by that the lips 30 of the slider 26 are inserted in to the outermost notches 15 of the slider receiver 13, the width of this invention may be between 4.0 inches and 7.0 inches, preferably 4.0 to 5.0 inches. Therefore, the width of this invention can be selected ranging from 2.0 inches to 7.0 inches.

According to wall frame sizes, this invention can be adjusted to space ranging from 2.0 inches to 7.0 inches. The space is regarded as a distance between wall frames and all edges of the walls, usually between wall frames and the chair rail and baseboard of the walls.

This invention may be used as follows: 1) determine wall frame sizes and the space around wall frames from a wall, 2) set the height of each arm member 11 as the same as the size of the determined space by adjusting the location of the slider in the slider receiver 13, 3) set the angle between two arm members 11 corresponding to the shape of the wall frames, 4) put this invention on either top or bottom corner of one side of the wall, specifically either below the chair rail or above the baseboard on one side of the wall, wherein the bottom faces of the sliders 13 simultaneously contact both one side edge of the wall and either the bottom edge of the chair rail or the top edge of the baseboard, 5) put one wall frame in the space between two arm members 11 by having the wall frame touch on the top faces of two arm members 11, 6) nail the wall frame on the wall, 7) put this invention right next to the wall frame and on either top or bottom edge of the wall, 8) put the second wall frame on the invention, 9) nail the second wall frame on the wall, and 10) repeat this process until all wall frames are installed on the wall.

This invention causes several conventional tools for marking wall frames on the wall such as rulers, levels, lasers, snapping lines, and even pencils, to be no longer necessary, and it makes the wall frame marking job simpler, easier, quicker and more convenient. This invention can be easily used by anyone without hardship. With this invention, amateurs, even first-time do-it-yourselfers, can perform the wall frame marking job easily and perfectly.

What is claimed is:

1. A wall frame marking tool comprising:
    (a) a pair of arm members, which is identical, each of which comprising:
        (1) a base which is a single elongated flat bar, wherein the width on one side of said base is wider than that on the other side of said base, and wherein a slider receiver is formed on the wider side of said base and a pivot portion is formed on the other, narrower side of said base;
        (2) said slider receiver, having a rectangular shape and bilateral symmetry, and comprising:
            (i) an edge beading on edges of top, left and right sides of both front and back faces of said slider receiver;
            (ii) a plurality of notches formed in opposed inner edge of said edge beading of left and right sides on the front face of said slider receiver;
            (iii) a straight line beading running horizontally from the end of the left side of said slider receiver to the end of the right side of said slider receiver on the back face of said slider receiver;

(iv) a slot, which is located in the middle of said slider receiver, running from a top end of said slider receiver to said straight line beading;
wherein there is the same number of said notches on said opposed inner edge of each of the left and right sides of said slider receiver, and each notch on the left side of said slider receiver corresponds exactly to each notch on the right side of said slider receiver; and
(3) said pivot portion comprising:
  (i) a pivot area, which is located at the end of one side of a front face of said pivot portion and has two bumps and a plurality of grooves which are an even number, wherein both said two bumps and said plurality of grooves are located in a circle radially, at the same distance from the center of said pivot area and at the same angle and distance from each other, and wherein said two bumps face each other every two grooves face each other from the center of said pivot area, and wherein there is a small hoe in the center of said pivot area;
  (ii) a triangular shape beading at the end of an opposite side on a front face of said pivot portion;
  (iii) a straight line beading on a back face of said pivot portion running horizontally from the left side end of the back face of said pivot portion to outside end of the back face of said pivot area; and
  (iv) an edge beading on all edges of the back face of said pivot portion, wherein said edge beading on the edge of the left side of the back face of said pivot portion which is entirely connected to said edge beading on the edge of the right side of the back face of said slider receiver;
(b) a pair of sliders, which is identical, each of which comprises:
  (1) a base of said slider which is a single elongated flat bar having a rectangular shape;
  (2) a edge beading which is on edges of bottom, left and right sides of a front face of said slider;
  (3) a straight line beading of said slider which is connected between said edge beading on said left and right sides of said front face of said slider;
  (4) two lips which are identical and located at said edge beading on said left and right sides of said slider, wherein one lip of said two lips is on a top end of said edge beading on said left side of said slider and the other lip of said two lips is on said top end of said edge beading on said right side of said slider; wherein said two lips are inserted into two of said notches of said slider receiver;
  (5) two notches of said slider which are identical and located behind said two lips of said slider, wherein one notch of said two notches is on the left end of the top of said slider and the other notch of said two notches is on the right end of the top of said slider;
  (6) a positioner, which is located in the middle of the top of said slider and located right above said straight line beading of said slider, having a square and rectangular shape and a hole in the center of said positioned;
(c) a pair of retainers, which is identical, each of which, having a bilateral symmetry, comprises:
  (1) a bulge which is in arch or rounded shape and in the middle of said single bar;
  (2) two legs which are identical and horizontally flat on the opposite side; and
  (3) two notches which are identical and each of which is located said bulge and each of said legs.

2. The tool of claim 1, wherein a distance between every two notches of each of said left and right sides of said slider receiver is 0.5 inch.

3. The tool of claim 1, wherein a width of said wall frame marking tool is selected ranging from 2.0 inches to 7.0 inches.

4. The tool of claim 1, wherein a width of said pivot portion is narrower than that of said slider receiver and a top face of said pivot portion is horizontally connected to the top face of said slider receiver so that a top face of said arm member is flat and level.

5. The tool of claim 1, wherein a height of said edge beading on said front face of said slider receiver is the same as that of said triangular-shaped beading of said pivot portion and a height of said edge beading on said back face of said slider is the same as both a height of said straight line beading on said back face of said slider receiver and a height of said edge beading of said back face of said pivot portion.

6. The tool of claim 5, wherein said two arm members are pivotally connected and jointed by overlapping said pivot areas of said two arm members by that said two bumps of one arm member of said two arm members are inserted into two of said grooves of the other arm member of said two arm members.

7. The tool of claim 6, wherein an angle between said two arm members is selectively adjusted ranging from 30 degrees to 90 degrees.

8. The tool of claim 1, wherein total thickness of said pivot portion except said triangular-shaped beading is a half of a thickness of said slider receiver.

9. The tool of claim 8, wherein, when said two arm members are connected each other, a thickness of said connected two arm members is the same as a thickness of each said arm member.

10. The tool of claim 8, wherein said two members are securely connected each other without movement or fall-off by fastening said two members with securing tools through said small hole of the center of said pivot area of each said arm member.

11. The tool of claim 1, wherein a depth of said two notches of said slider ends right above said straight line beading of said front face of said slider and said two notches are in a V-shape or triangular shape.

12. The tool of claim 1, wherein said positioner is protruded outwardly from both said front and back faces of said slider so that said positioner has its own front and back portions.

13. The tool of claim 12, wherein a height of said positioner on said front face of said slider is the same as that of both said edge beading and said straight line beading on said front face of said slider, and a height of said positioner on said back face of said slider is the same as a thickness of said base of said slider receiver.

14. The tool of claim 13, wherein said back portion of said positioner is placed in said slot of said slider receiver and can be moved up and down in said slot.

15. The tool of claim 13, wherein a size of a hole of said front face of said positioner is bigger than a size of a hole of said back face of said positioner and a depth of said hole of said front face of said positioner is deeper than a depth of said hole of said back face of said positioner.

16. The tool of claim 15, wherein said depth of said hole of said back face of said positioner is shorter than a width of said two notches of said retainer.

17. The tool of claim 1, wherein said retainer is in a shape of the majuscule letter of omega (Ω).

18. The tool of claim 1, wherein edges of said two legs of said retainer is chamfered and dulled in order that users can easily squeeze said retainer without cutting their fingers.

19. The tool of claim 1, wherein said retainer is made out of a elastic material comprising plastic, rubber or any combination thereof.

* * * * *